Figure 1:
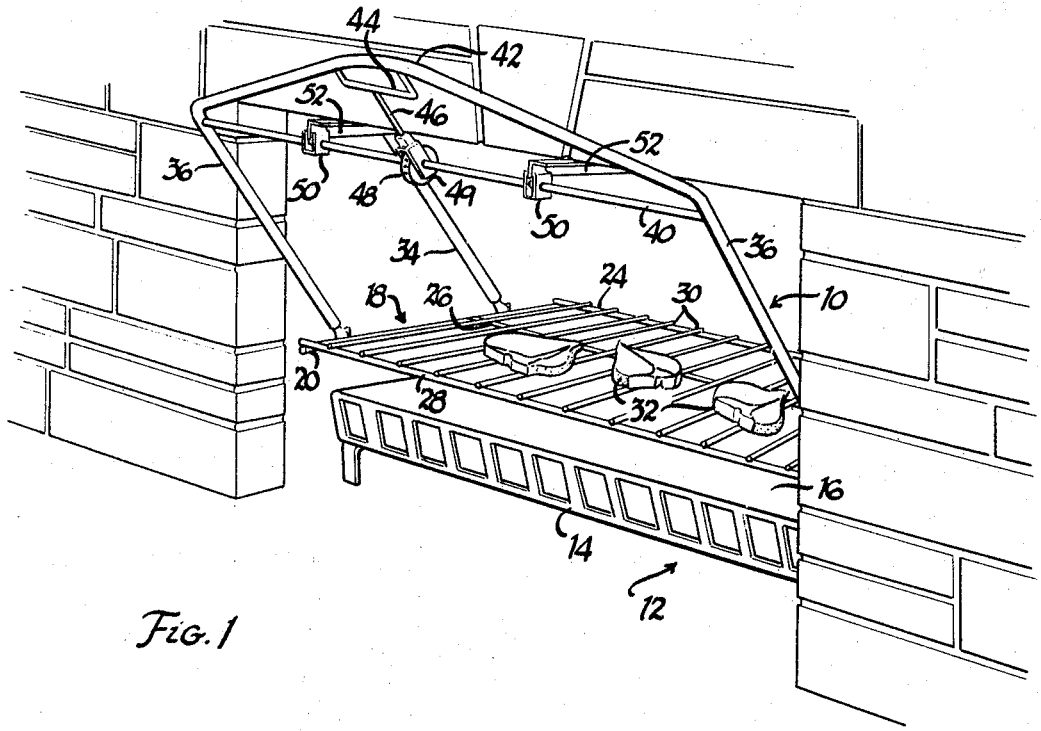

March 28, 1967   J. A. BERGEL ETAL   3,311,105
BARBECUE GRILL
Filed Aug. 12, 1965   2 Sheets-Sheet 1

Inventors
JAMES A. BERGEL
THEODORE R. KURILUK
WILSON, SETTLE, BATCHELDER
ATT'YS.   & CRAIG March 28, 1967  J. A. BERGEL ETAL  3,311,105
BARBECUE GRILL Filed Aug. 12, 1965  2 Sheets-Sheet 2

Inventors
JAMES A. BERGEL
THEODORE R. KURILUK

WILSON, SETTLE, BATCHELDER
ATT'YS. & CRAIG

United States Patent Office 3,311,105
Patented Mar. 28, 1967

3,311,105
BARBECUE GRILL
James A. Bergel, 1663 N. Gulley Road, and Theodore R. Kuriluk, 1555 N. Gulley Road, both of Dearborn Heights, Mich. 48128
Filed Aug. 12, 1965, Ser. No. 479,153
6 Claims. (Cl. 126—137)

This invention relates to a cooking grill and more particularly to a removable, slidably mounted and arcuately adjustable fireplace grill that can be quickly installed in virtually all home fireplaces.

In the field of home fireplace grills for sophisticated cooking purposes, such as the barbecuing of steaks and the like, as opposed to the simple grilling of frankfurters, the problem has been one of proper heat distribution at different times during the preparation of the meat. At one stage of grilling a portion of meat, a high flame, intense heat may be required, while at varying stages this requirement may vary appreciably until such time as a comparatively light heat may be desired.

In the past when such needs for heat variances occurred, much effort was needed to either relocate the grill in relation to the fire or drastically readjust the fire intensity in the hearth generally with the consummate results of smoke and sparks.

Our invention seeks to alleviate the above mentioned distress areas through the grill's design.

In general the fireplace grill of our invention consists of a grill supported by and pivotally mounted on two pairs of arms which are pivotally mounted above the grill to a pair of longitudinally disposed arms which are designed to be slidably received in a pair of brackets fixedly mounted below the upper limits of the fireplace proper. The ease of adjustment of the grill is facilitated by means of a rotary adjustment member located on one of a pair of cross shafts located between a pair of slide rails.

The rotary adjustment can be activated by temporarily withdrawing a rod element locking the rotary member and grill in position. The grill assembly is then pivoted about the axis of the rotary adjustable member and the locking rod is then reinserted when the desired arcuate change is accomplished by pressure on the grill's handle rod which extends in generally a U-shaped configuration upwardly from one of the pairs of pivot rod members. The adjustment can thus be made to swing the grill to a wide range of greater or lesser proximities to the fire.

After usage the grill can be easily removed from the fireplace and folded upon itself, thus presenting a flat surface which can be readily stored by means of a simple hook upon a wall.

With the foregoing in mind an object of our invention is to construct a grill of simple design which can be received by a wide variety of home fireplaces.

Another object of our invention is to construct a grill which is completely adjustable, both horizontally and vertically about an arcuate path.

A further object of our invention resides in the provision of positive locking means for various vertical adjustments.

A still further object of this invention is to construct a grill which can be easily removed from the fireplace and, after being folded upon itself, be hung on a wall by means of a simple hook, peg or other architectural outcroppings.

Other objects of this invention will appear in the following description and appended claims, reference being had to the accompanying drawings forming a part of this specification wherein like reference characters designate corresponding parts in the several views.

Figure 2:
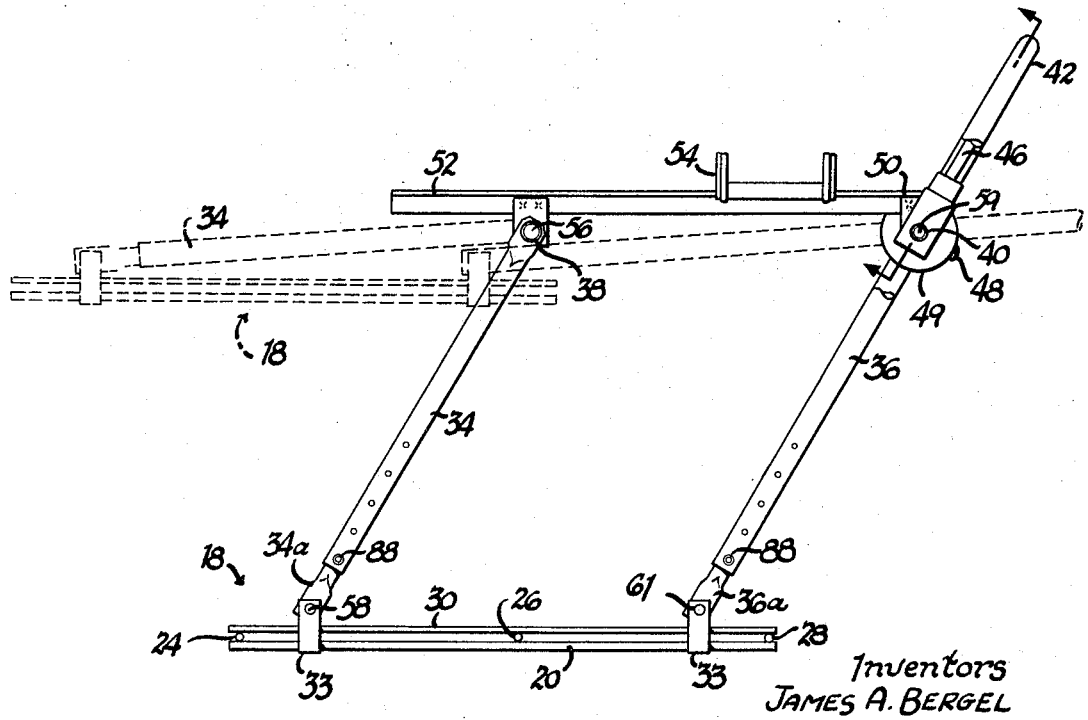
Figure 3:
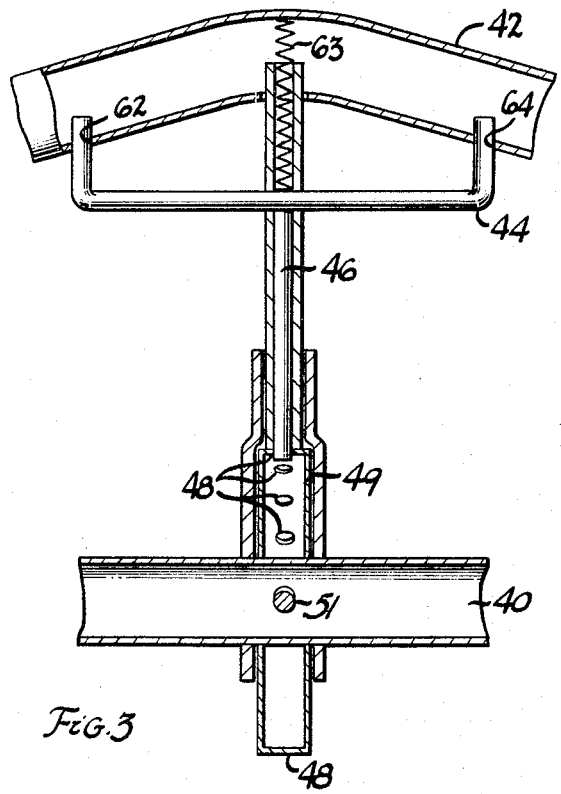
Figure 4:
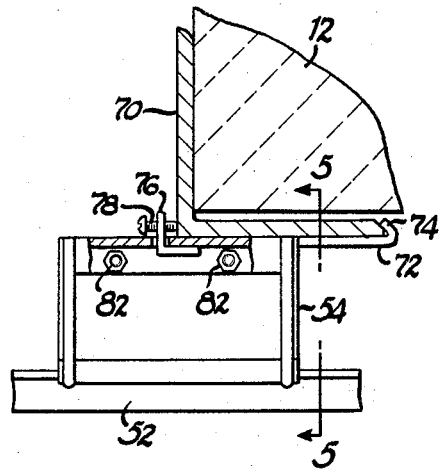
Figure 5:
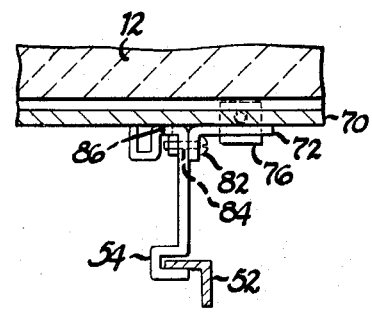
Figure 6:
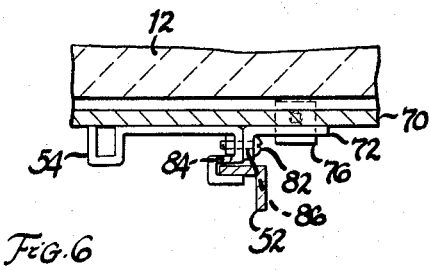
Figure 7:
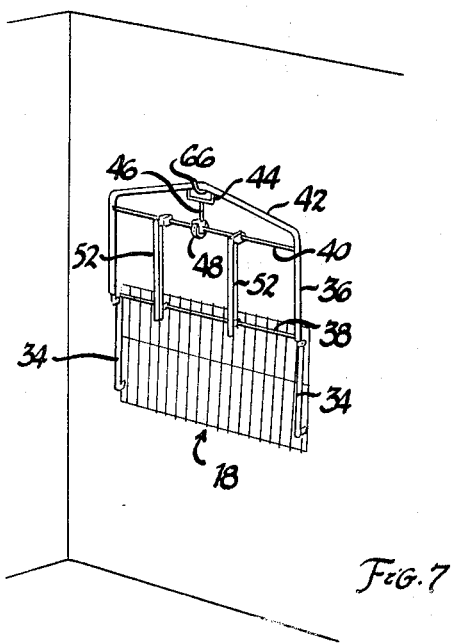

In the drawings:
FIGURE 1 is a perspective view of a grill assembly embodying our invention and showing the grill in place within a fireplace.
FIGURE 2 is a side elevational view of the grill with parts cut away for better illustration.
FIGURE 3 is a view of the rotatable adjusting member, and the handle of the grill, taken along the lines 3—3 of FIGURE 2 looking in the direction of the arrows.
FIGURE 4 is a side elevational view of the slide rails of the grill and the brackets receiving the slide rails in attached relationship to the fireplace, shown with parts broken away for better reference.
FIGURE 5 is a view taken along the lines 5—5 of FIGURE 4, looking in the direction of the arrows.
FIGURE 6 is a view showing the bracket receiving the slide rail in an adjusted position.
FIGURE 7 is a view showing the grill in folded position stored on a wall.

Before explaining the present invention in detail, it is to be understood that the invention is not limited in its application to the details of construction and arrangements of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, FIGURE 1 illustrates a grill generally indicated at 10 in operable position to a fireplace 12 with the fireplace having within its confines a brazier or hearth 14 containing burning charcoal or other combustible material 16.

The grill assembly 18 constructed of a pair of end rods 20 in welded relationship at right angles to rod elements 24, 26 and 28. Welded on rods 24, 26 and 28 parallel to end rods 20 are a plurality of rods 30 forming the platform of the grill 18 to support the meat 32 or other material to be cooked over the fire 16.

Pivotally mounted to clips 33 secured to the rods 20 of the grill 18 are two pairs of swing arms 34 and 36. The swing arms are attached in pivotal relation to the end rods 20 by portions 34a and 36a which are extensions of the arms 34 and 36, respectively. The swing arms 34-36 extend upwardly from the grill 18 to engage rear and front shafts 38 and 40 respectively. The shafts 38 and 40 are disposed at right angles to the swing arms 34 and 36 and form the axis of the upper pivot points of the swing arms.

While the rear swing arms 34 pivotally terminate on the laterally extending shaft 38, the front arms 36 are pivotally mounted on the front shaft 40 and extend upwardly to meet and form a substantially U-shaped handle 42. Centrally located relative to the U-shaped handle 42, and extending downwardly therefrom in telescoping relation relative to the handle 42 is a U-shaped actuating arm 44. The arm 44 carries a shaft 46 on its center extending downwardly to be slidably received into circumferentially spaced apertures 48 in a locking wheel 49 fixedly mounted, as by pin 51, on the front shaft 40.

Extending outwardly from the locking wheel 49 on shaft 40 and located substantially one-half the distance between the locking wheel 49 and the front swing arms 36, are a pair of slide rail brackets 50 secured to the front shaft 40 and welded at their upper ends to a pair of the laterally spaced rails 52. The rear shaft 38 is also secured relative to the rails 52 to permit angular swinging movement of the rear swing arms 34 relative thereto. This may be achieved by welding the rear shaft 38 to the rails 52 and permitting the swing arms 34 to pivot thereon, or by fixing the shaft 38 to the swing arms 34 and permitting the shaft to pivot in brackets secured to the rails 52.

The rails 52 of the grill 10 are slidably received within a pair of brackets 54 in the form of rails fastened to the cavity of the fireplace 12 and extending from the front of the fireplace to and anchored in the back of the fireplace in a generally horizontal manner.

In using the grill assembly 10, the meat 32 or other material to be cooked is first placed upon the grill element, generally indicated at 18 and then the rails 52 of the grill 10 are aligned with and are slidably received by the brackets or rails 54. The grill 10 is then slid into the fireplace 12 by means of the rails 52 of the grill being slidably moved with reference to the brackets 54 located close to the ceiling of the fireplace 12. This occurs after the fire in the brazier 14 is of the desired quantity.

As the meat 32 is cooking a change in proximity to the fire 16 may be desirable, as by moving the meat to an area of lower heat intensity after the first searing operation. When this is required, the desired change is accomplished by exerting upward pressure on the arm 44. As the arm 44 is telescoped into the handle 42, the pin 46 carried by the arm 44 is withdrawn from contact with one of a series of apertures 48 located circumferentially about the rotary locking wheel 49.

Thus removed from a locked position the grill 10 is free to pivot about the axis of shafts 38 and 40 as at pivot points 56 and 58 of the rear swing arms 34 and at the points of pivot 59 and 61 of the front swing arms 36. As downward pressure is exerted on the handle 42 formed by swing arms 36, the grill 18 is arcuately adjusted upwardly by the parallelogram type swing arms 34 and 36 operating about the pivot points 56 and 58 at the rear, and 59 and 61 at the front.

As the grill 18 is elevated due to the action of the parallel motion mechanism, the rails 52 of the grill are withdrawn with reference to the rails 54 of the fireplace. When the desired position for continued cooking has been reached by the grill 18, the driving downward pressure on handle 42 is eased. The pressure upward on arm 44 is simultaneously released permitting the shaft 46 to enter a different aperture 48 in the locking wheel 49. Upon release of manual upward pressure, the shaft 46 is energized downward by a spring 63 seated at its upper extremity within handle 42, and seated at the lower end on arm 44. Arm 44 is slidably engaged with handle 42 as indicated by ports 62 and 64 in handle 42 as shown in FIGURE 3. The meat 32, after the application of proper cooking techniques as by exposing opposite faces thereof at various proximities to the fire 16, is ready to be consumed. As this situation is attained the grill 18 is slid forwardly by shifting the channels 52 of the grill outwardly on the rails 54 of the fireplace 12, and the meat 32 is removed from the grill 18.

The grill 10 may be folded upon itself through pivot points 56, 58, 59 and 61 on cross shafts 38 and 40 acting to bring the components of the grill 18 into parallel relationship by the swinging of the arms 34 and 36 as illustrated in FIGURE 7. The rails 52 on brackets 50 mounted on shaft 40 pivot downwardly to form a parallel relationship to arms 34 and 36. Thus presented the grill 10 is in condition for storage on a hook 66 in a wall 68 as shown in FIGURE 7.

Further means of adjustment for the grill 10 in relation to a fire 16 is illustrated in FIGURES 4, 5 and 6.

FIGURE 4 shows a slide rail 52 slidably mounted in a bracket 54 which is attached to an angle iron 70 in the fireplace 12. As shown in FIGURES 4 and 5 the bracket 54 receiving the rail 52 is attached to the iron 70 by an angle bracket 72 having a lip portion 74 lapping the forward end of the iron 70. The bracket 72 has an adjusting screw 78 carried by a clip 76 welded to the bracket 72. Extending through the bracket 72 are a series of bolt holes which accommodate a nut and bolt combination 82 to secure the bracket 54 to the bracket 72. This is accomplished by holes 84 and 86 in the bracket 54.

It is to be noted as shown in FIGURES 5 and 6 that bolt holes 84 are located 90° from holes 86 in bracket 54. The purpose of this is to allow bracket 54 to be rotated as at FIGURE 6 to accommodate rail 52 in greatly increased elevation in the fireplace 12.

A further adjusting means is illustrated in FIGURE 2 wherein the rear and front swing arms 34 and 36 are of a construction which allows the lower portions 34a and 36a of arms 34 and 36 to be downwardly adjusted in sleeved relation within the arms 34 and 36. After such adjustments occur, either raising or lowering the grill 18, pins 88 lock the adjusting members in place.

Having thus described our invention, we claim:

1. A removable and replaceable grill for a fireplace having a chimneyed roof area and a back wall, a pair of spaced apart grill guiding rails secured in the chaimneyed roof area of the fireplace and terminating at the back wall thereof, comprising a substantially flat grid structure, laterally spaced front and rear pairs of grid supporting arms pivotally mounted on the grid structure, a laterally extending rod interconnecting the laterally spaced arms of one of said pairs of arms, laterally spaced grill supporting rails operably connected to the front and rear grid supporting arms and adapted to engage the grill guiding rails, a handle operably connected to the front grid supporting arms, and locking means to clampingly secure the grill in angularly adjusted positions.

2. The removable and replaceable grill defined in claim 1 wherein said supporting arms define a parallelogram type linkage interposed between the substantially flat grid structure and the grill supporting rails.

3. The grill defined in claim 1 wherein the locking means to clampingly secure the grill in angularly adjusted positions comprises a fixed shaft having an apertured locking wheel, and manually actuated pin means adapted to clampingly engage the locking wheel.

4. An adjustable fireplace grill for use in a fireplace having a hearth spaced grill guiding means, a substantially flat grill member, a parallelogram linkage pivotally connected to the grill member and extending upwardly therefrom, rails secured to the parallelogram linkage and adapted to engage the fireplace grill guiding means.

5. The fireplace grill defined in claim 4 wherein locking means are provided to lock the parallelogram linkage in angularly adjusted positions to vary the height of the grill above the hearth.

6. The fireplace grill defined in claim 4 wherein the parallelogram grill supporting linkage is pivotal to a substantially straight line flat configuration for storage.

References Cited by the Examiner

UNITED STATES PATENTS 2,912,973  11/1959  Lucas _____ 126—30
3,016,894  1/1962  Cleary _____ 126—137

FREDERICK KETTERER, *Primary Examiner.*